(12) United States Patent
Ho

(10) Patent No.: US 9,932,420 B2
(45) Date of Patent: Apr. 3, 2018

(54) MODIFIED FLUOROPOLYMERS

(71) Applicant: THE UNITED STATES OF AMERICA AS REPRESENTED BY THE SECRETARY OF THE ARMY—U.S. ARMY RESEARCH LABORATORY, Washington, DC (US)

(72) Inventor: Janet Sau-Han Ho, Columbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 15/013,004

(22) Filed: Feb. 2, 2016

(65) Prior Publication Data
US 2017/0218098 A1    Aug. 3, 2017

(51) Int. Cl.
*C08F 2/46* (2006.01)
*C08G 61/04* (2006.01)
*C08F 14/22* (2006.01)
*C08J 7/12* (2006.01)
*H01B 3/44* (2006.01)
*H01G 4/14* (2006.01)

(52) U.S. Cl.
CPC .............. *C08F 14/22* (2013.01); *C08J 7/12* (2013.01); *C08J 7/123* (2013.01); *H01B 3/445* (2013.01); *H01G 4/14* (2013.01); *C08J 2327/16* (2013.01)

(58) Field of Classification Search
USPC .................................................. 522/1; 520/1
See application file for complete search history.

(56) References Cited

U.S. PATENT DOCUMENTS

2007/0160888 A1*  7/2007  Takahashi ............ C08F 259/08
                                                              429/483

OTHER PUBLICATIONS

Friesen et al, Radical copolymerization of vinylidene fluoride (VDF) with Oligo(hexafluoropropylene oxide) perfluorovinyl ether macromonomer to obtain PVDF-g-oligo(HFPO) graft copolymers, Oct. 1, 2015, Macromolecules, 48, 7060-7070.*
J. Connolly and M. Dunn, "High Energy Capacitor development at ABB Power T&D", IEEE Intern. Conf. Conduction and Breakdown in Solid Dielectrics, pp. 110-113, 1998.
J.R. MacDonald, M.A. Schneider, J.B. Ennis, F.W. MacDougall, and X.H. Yang, "High Energy Density Capacitors", IEEE Electrical Insulation Conference, pp. 306-309, 2009.

* cited by examiner

*Primary Examiner* — Jessica E Whiteley
(74) *Attorney, Agent, or Firm* — Robert Thompson

(57) ABSTRACT

Modified fluoropolymers, and methods for manufacturing modified fluoropolymers are provided. According to at least one embodiment, chemically modified fluoropolymers, via radical generation and subsequent reaction, produce fluoropolymers having fluorinated moieties and/or non-fluorinated moieties, disrupting highly coherent polar domains, wherein the non-fluorinated moieties include, for example, at least one of carbonyl, hydroxyl, alkoxy, alkyl, and/or aromatic chemical groups.

7 Claims, 7 Drawing Sheets

MODIFIED FLUOROPOLYMERS

GOVERNMENT INTEREST

Governmental Interest—The invention described herein may be manufactured, used and licensed by or for the U.S. Government. Research underlying embodiments of the present invention was sponsored by the U.S. Army Research Laboratory (ARL).

FIELD

Embodiments of the present invention generally relate to modified fluoropolymers and methods for manufacturing modified fluoropolymers.

BACKGROUND

Dielectric materials are electrical insulators that can be polarized by an applied electric field, which makes dielectric materials useful for many applications, such as energy storage within electrical capacitors. Many capacitors use films made from thermoplastic dielectric polymers. Furthermore, polymers such as polypropylene (PP) and polyethylene terephthalate (PET) are used for high voltage applications, i.e., at least kilo-volt range dielectrics. However, dielectric polymers, as is typical of most dielectric or electrical insulating materials, undergo significant losses in dielectric strength, or insulating resistance, when subjected to stresses, such as applied AC or DC electrical stresses.

Also, dielectric materials exhibit many other electrical properties, such as charge/discharge efficiency, dielectric constant, dielectric loss, for example, over a specific range of electric frequency and/or voltage ranges, and overall energy density. However, these electrical properties must frequently be balanced in designing components for the service applications and/or environments in which they are used, such as dielectric materials. For example, some dielectric polymers, e.g., PP and PET, have excellent charge/discharge efficiencies but have relatively low dielectric constants. To date, past attempts to provide dielectric materials having high dielectric constants and high charge/discharge efficiencies have failed.

With the foregoing in view, the inventor has provided novel classes of modified fluoropolymers for use in, for example, dielectric materials, including dielectric films, for applications that include at least capacitors, e.g., high voltage capacitors; resonators, such as antennas and oscillating circuits, separators and/or binders for cells, batteries, and the like; and actuators, micro-actuators, transducers, and sensors that exhibit higher charge/discharge efficiency and low dielectric loss in high fields without sacrificing overall energy density and other electrical properties, such as dielectric constant, impedance, and capacitance, and have larger voltage ranges and/or frequency ranges for service applications having varied and/or variable environmental requirements.

SUMMARY

Embodiments according to the present invention relate to modified fluoropolymers. According to embodiments of the invention, methods for manufacturing the modified fluoropolymers comprises modifying the polymer backbone or moieties appended thereto via radical generation and reacting the radicals with various reactants to produce a fluoropolymer(s) having fluorinated moieties and/or non-fluorinated moieties so that highly coherent polar domains can be disrupted. The non-fluorinated moieties comprise oxygen groups including at least one of oxo, hydroxyl, or alkoxy, and/or alkyls, such as ethyl and/or propyl moieties, and/or aromatic chemical groups.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
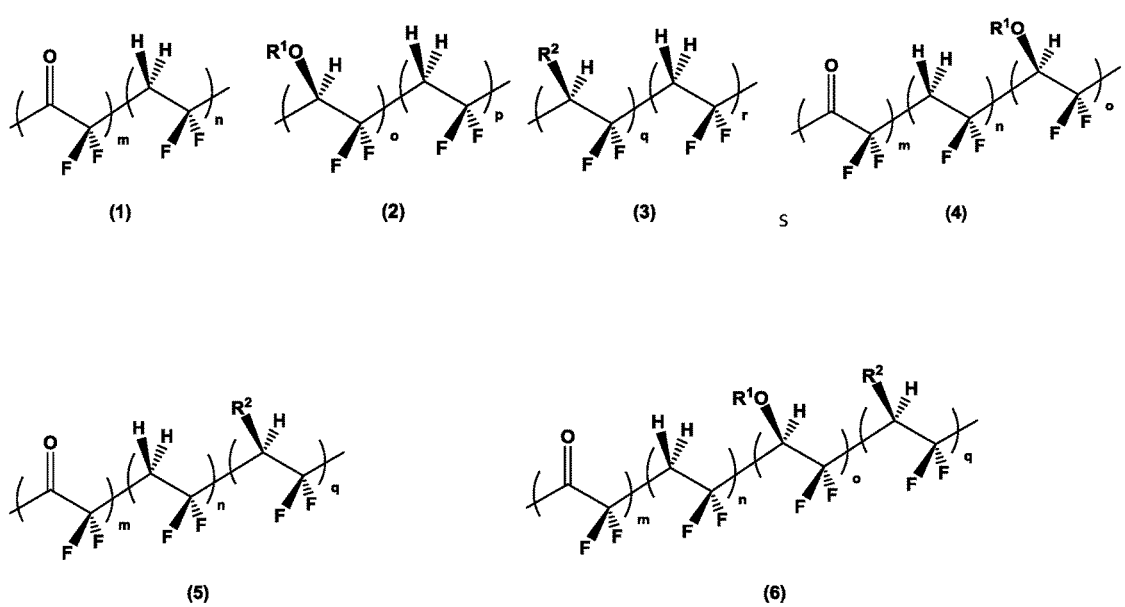
FIG. 1 depicts modified fluoropolymers according to embodiments of the invention.

Embodiments of the present invention are directed to modified fluoropolymers. The modified fluoropolymers can be used, for example, as dielectric materials for many applications. According to at least one embodiment, a method for manufacturing modified fluoropolymers comprises radical generation, i.e., removing hydrogen atoms from a fluoropolymer, for example, by irradiating the fluoropolymer via an electron beam and reacting the radicals with a reactant gas or liquid to produce fluoropolymers having fluorinated moieties and/or non-fluorinated moieties so that highly coherent polar domains can be disrupted, wherein the non-fluorinated moieties comprise at least one of oxo, hydroxyl, alkoxy, and/or other oxygen-containing moieties or alkyls, such as ethyl and/or propyl moieties, or aromatic chemical groups. At least one exemplary example of an aromatic chemical group comprises, but is not limited to, for example, 2-phenylethyls, such as 2-phenylethyl acetate, 2-phenylethyl alcohol, and/or 2-phenylethyl ester. Without intending to be limited by theory, it is believed that molecular forces in semi-crystalline regions and/or highly semi-crystalline regions, of the polymer are disrupted when hydrogen atoms bonded to carbon atoms on the polymer backbone, e.g., C—H, are substituted with larger moieties, e.g., hydroxyl, oxo, methyl, ethyl and other alkyls, alkoxys, and/or aromatic moieties, providing additional free volume and degrees of freedom, wherein dipoles can rotate more easily upon application of an electric field.

Exemplary fluoropolymers having, for example, dielectric constants greater than 10, which may be modified to produce novel classes of modified fluoropolymers according to embodiments of the invention, include poly (vinylidene difluoride) (PVDF) and its co-polymers and ter-polymers, e.g., poly (vinylidene chlorotrifluoroethylene) (PVDF-CTFE), poly (vinylidene hexafluoropropylene) (PVDF-HFP), and poly (vinylidene trifluoroethylene) (PVDF-TrFE). Additional copolymers, which can be modified to create modified fluoropolymers according to the invention, further comprise perfluoroalkoxy alkanes (PFA), e.g., tetrafluoroethylene $(C_2F_4)_m$ and perfluoroethers $(C_2F_3OR)_n$, where R is a perfluorinated group such as trifluoromethyl ($CF_3$). It is believed that coherent polar domains of the fluoropolymers are disrupted when at least some of the carbon-hydrogen bonds are substituted with larger moieties, producing modified fluoropolymers having higher charge/discharge efficiencies and lower dielectric loss while having dielectric strengths and dielectric constants that are comparable to, for example, PP or PET. Also, embodiments according to the invention include novel modified fluoropolymers in which non-fluorinated moieties, which may be less polar than carbon-fluorine bonds, disrupt coherent polar domains formed with the carbon-hydrogen bonds of the fluoropolymers. In other words, substituting, for example, hydrogen atoms on the carbon backbone with, for example, non-fluorinated moieties, permits greater atomic rotation and degrees-of-freedom.

Additionally, embodiments according to the invention further comprise polymeric films, such as fluoropolymeric films that are approximately one to 100 micrometers thick. At least one exemplary embodiment according to the invention comprises a fluoropolymeric film six to ten micrometers thick, which are processed into novel modified fluoropolymers films. Furthermore, commercially available fluoropolymeric films, such as PVDF, PVDF-CTFE, PVDF-HFP, PVDF-TrFE, and PFA, which are manufactured by Solvay America, Inc. and Arkema, Inc., and other manufacturers, may be modified into modified fluoropolymer films according to embodiments of the invention.

PVDF:

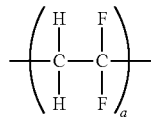

PVDF-CTFE:

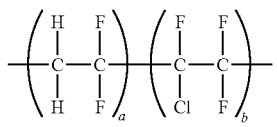

PVDF-HFP:

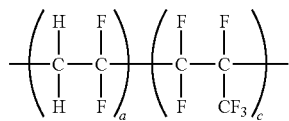

PVDF-TrFE:

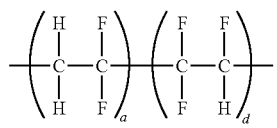

It is to be understood that the following terms used herein are for the purpose of describing particular embodiments only, and is not intended to be limiting. The term "fluoropolymer" refers to polymers in which hydrogen atoms on the molecular backbones are partially or entirely replaced by at least one fluorine group or atom. The term "oxygen-containing moieties" refers to units in which hydrogen atoms on the olefin backbones are partially or entirely replaced by at least one oxygen group, such as "oxo groups," e.g., referring to structures having a carbon-oxygen double bond C=O; "hydroxyl groups" referring to structures having carbon-hydroxyl bonds C—OH; "alkoxy groups" referring to structures having carbon-oxygen bonds C—OR, where R represents a normal or branched alkyl group, having unsaturated character, and for e.g., carbon numbers from 1 to 20. The term "alkyl group" refers to any alkyls that are either saturated or unsaturated normal or branched alkyl groups, having carbon numbers from 1 to 20. The term "aromatic" or "aromatic group" refers to any group having "aromaticity", i.e., conjugated unsaturations, for example, but not limited to, phenyl, alkylphenyl, naphthalene, alkylnaphthalene, or higher order of fused or non-fused aromatic groups.

FIG. 1 depicts modified fluoropolymers according to embodiments of the invention.

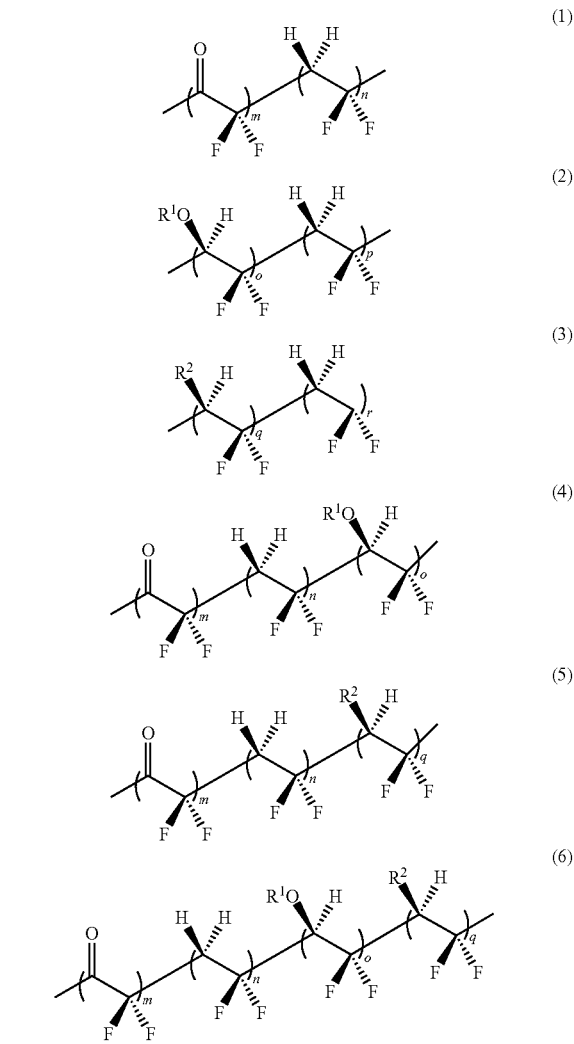

Polymeric structures (1)-(6) are modified fluoropolymers in which $R^1$ is either a hydrogen group or an alkyl group selected from either saturated or unsaturated, normal or branched alkyls with carbon numbers ranging between 1 and 20; and $R^2$ is an alkoxy, e.g., methoxy, ethoxy, or the like, a saturated or unsaturated, normal or branched alkyls with carbon numbers ranging between 1 and 20, or groups containing varying degree of aromaticity, the examples of which include, but are not limited to, phenyl, 2-ethylphenyl; and in which m, n, o, p, q and r segments are either integers, fractions or decimals that reflect the relative molar ratios of the copolymeric units in the convention that is well understood by one of ordinary skill in the art. For example, for polymeric structure (1), m and n total 100% and m may be from 5 to 95% and n may be from 5 to 95%. Similarly, o and p in polymeric structure (2) and q and r in polymeric structure (3) total 100% and may be from 5:95. For polymeric structures (4), (5), and (6), each of which have three segments, each may comprise molar ratios of 5 to 85%, so long as the sum is 100%. Where m, n, o, p, q, and r are expressed in decimals, a sum of 1 is maintained. Furthermore, the copolymeric units represented by m, n, o, p, q and r could be arranged in alternating, block, or random manner as is known to those in the art.

As can be seen in a polymeric structure (1), the m segment comprises a carbonyl group. The polymeric structure (2) comprises a hydroxyl group in the o segment where $R^1$ is a hydrogen atom. A polymeric structure (3) comprises an ethoxy group where $R^2$ represents an $-OC_2H_5$ moiety in the q segment. A polymeric structure (3) comprises an ethyl group where $R^2$ represents an $-C_2H_5$ moiety in the q segment or a propyl group where $R^2$ represents a $-C_3H_7$ moiety.

Some embodiments according to the invention comprise aromatic moieties. For example, the polymeric structure (3) may have a 2-phenylethyl group added as R, as indicated below, at either the first or second carbon atom of the ethyl part of 2-phenylethyl group.

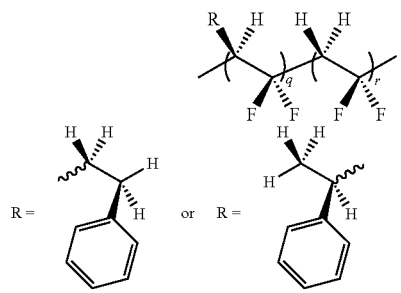

With reference to polymer structure (4), a multi-copolymeric modified fluoropolymer can be indicated. For example, where $R^1$ is an alkyl group, and, as shown, an ethyl group, the following multi-copolymeric modified fluoropolymer is indicated:

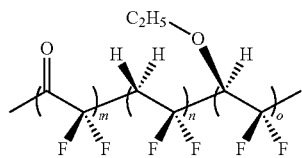

In practice, many substitutions may be made in any of the above polymeric structures (1)-(6) to create modified fluoropolymers according to embodiments of the invention.

Figure 2:
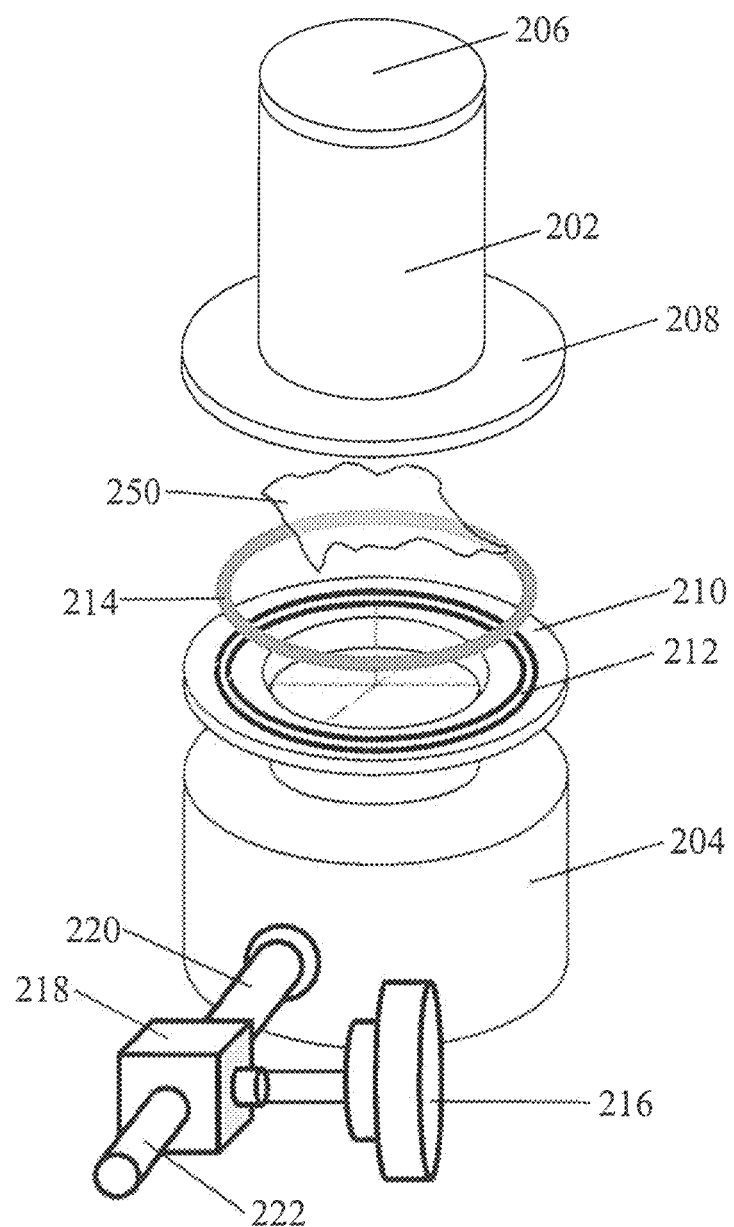
FIG. 2 depicts an exploded view of a film processing apparatus to manufacture modified fluoropolymers according to embodiments of the invention.

FIG. 2 depicts an exploded view of a film processing apparatus 200 to manufacture modified fluoropolymers according to embodiments of the invention. The film processing apparatus 200 comprises an upper main body 202 (which is made of, for example, stainless steel), an end cap 206 (which is made of a metal capable of absorbing electron beams, for example, aluminum), and a upper sealing shoulder 208 disposed opposite the end cap 206 (which is made of a metal capable of absorbing electron beams, for example, aluminum) on the upper main body 202, a lower main body 204 (which is made of, for example, stainless steel) having a lower sealing shoulder 210 for mating with the upper main body 202 when assembled and that further comprises an o-ring groove 212, an o-ring 214, a gas valve 216 that is capable of evacuating or providing a gas to an inner volume (not shown) located within the lower main body 204 of the film processing apparatus 200, a first conduit 220 that extends from the lower main body 204 and is in fluid communication with a junction box 218 and a second conduit 222 and the gas valve 216 for processing a film sample 250, for example, a PVDF, PVDF-CTFE, PVDF-HFP, PVDF-TrFE, or PFA film, into a modified fluoropolymer film, as discussed above. The film sample 250 may be specified in ranges of thickness. In general, a thinner film comprises less variability following processing by an electron beam. The film sample 250, which comprises, for example, a thickness of approximately six to approximately ten microns, is loaded into the film processing apparatus 200 and bombarded with an electron beam from an electron beam source (not shown) that is in communication within the upper main body 202 or the lower main body 204.

Figure 3:
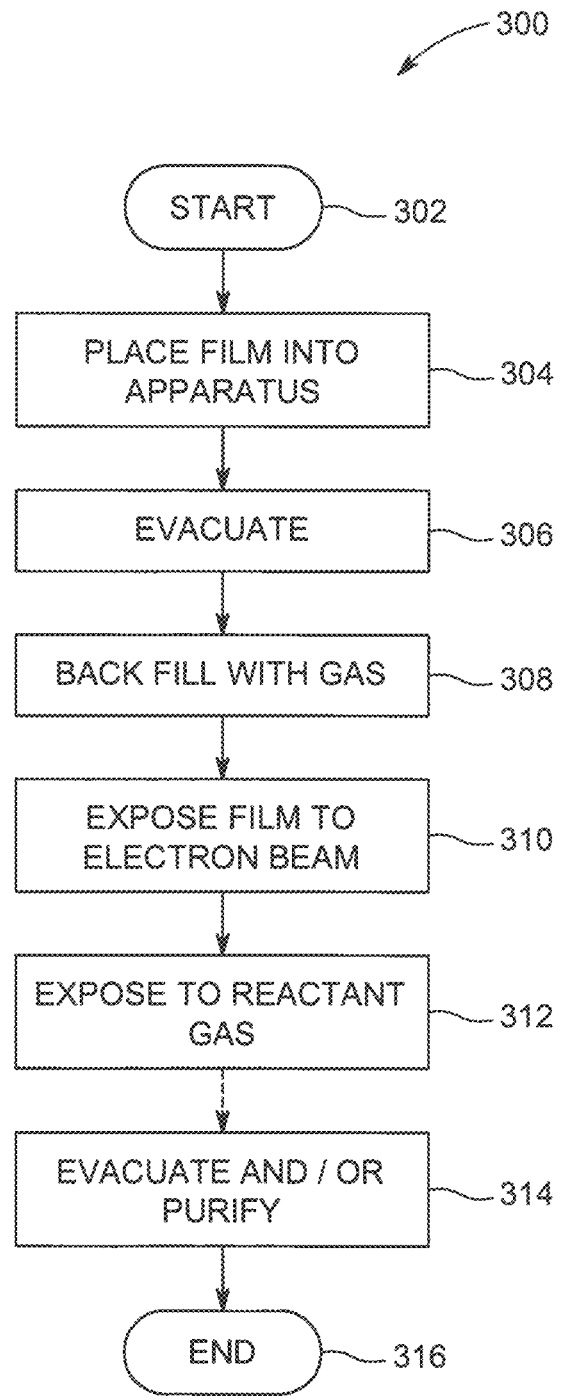
FIG. 3 depicts a flow diagram for a first method for manufacturing a modified fluoropolymer film according to embodiments of the invention.

FIG. 3 depicts a flow diagram 300 for a first method for manufacturing a modified fluoropolymer film according to embodiments of the invention. A fluoropolymeric film, for example, PVDF, which has a chemical formula of a repeat unit of $-(C_2H_2F_2)-_n$ can have both hydrogen atoms substituted with an oxygen atom to form a carbonyl group. The first method starts at step 302 and proceeds to step 304, wherein a PVDF film, for example, a PVDF film approximately six to ten microns thick, is delivered into a film processing apparatus, as discussed above. An inner volume of the film processing apparatus is evacuated using a gas valve and pump at step 306. The inner volume may be evacuated to any suitable pressure, for example, 100 millitorr or lower, to approximately 1 millitorr, or to 1 microtorr. The inner volume is then backfilled with a gas, for example, an inert gas, such as argon gas and/or nitrogen gas or like gases at step 308. The PVDF film is next irradiated to produce radicals, i.e., removing hydrogen atoms, for example, by exposing the PVDF film to an electron beam at step 310. In at least one embodiment according to the invention, the PVDF film, or other fluoropolymeric film described herein, absorbs approximately 10-35 kGrays and, for at least one exemplary embodiment, 12-31 kGrays. Without intending to be limited by theory, it is believed that the electron beam generates radicals, for example, removing one or more hydrogen atoms, leaving a reactive radical to produce a site on the backbone where other chemical moieties can be added and/or substituted as pendant groups by further exposure to a liquid or gaseous reactant.

At step 312, the inner volume is backfilled with a reactant gas, for example, an oxygen-containing gas, such as ozone gas. The inert gas is optionally evacuated via a valve from the inner volume before the reactant gas is backfilled.

Alternatively, the reactant gas may be supplied to the inner volume, displacing the inert gas. The PVDF film having free radicals is then reacted with the ozone gas to create the carbonyl groups within the PVDF film. At step 314, the inner volume is, for example, optionally evacuated for safety reasons, the film sample is optionally purified, for example, using a Soxhlet device, and the method ends at step 316. At least one alternative reactant gas suitable for use at step 312 is ethylene gas, which, when exposed to the radicalized PVDF film, creates at least one pendant alkyl group on the polymer backbone.

Figure 4:
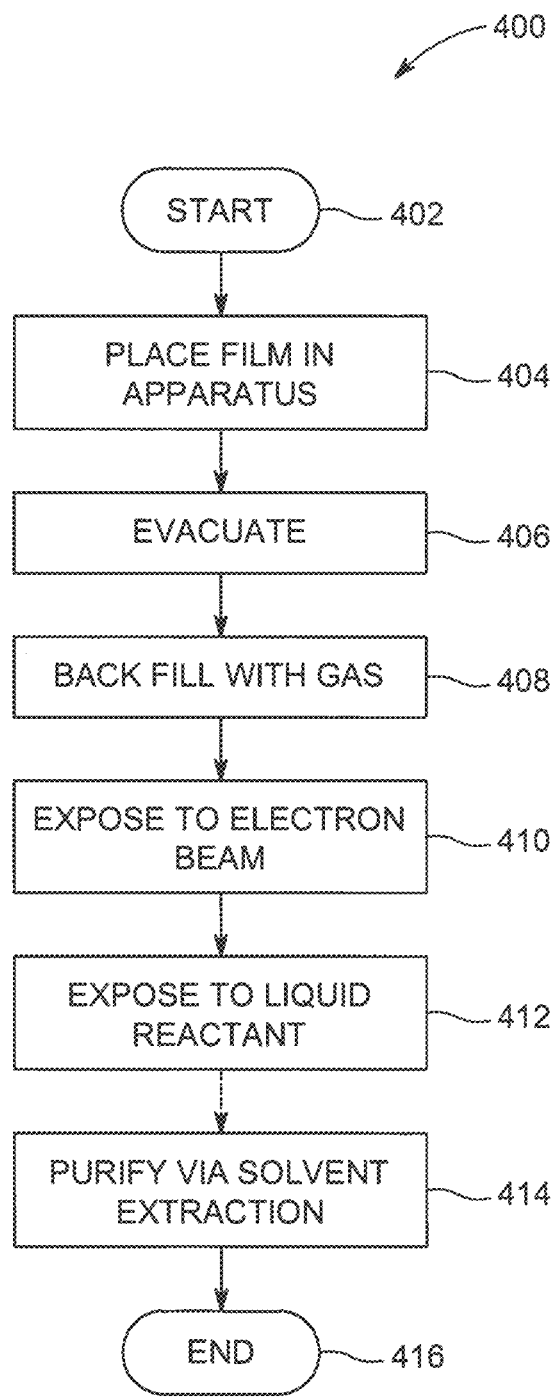
FIG. 4 depicts a flow diagram for a second method for manufacturing a modified fluoropolymer film according to embodiments of the invention.

FIG. 4 depicts a flow diagram 400 for a second method for manufacturing a modified fluoropolymer film according to embodiments of the invention. For example, PVDF, which has a chemical formula of a repeat unit of —$(C_2H_2F_2)$—$_n$, or other fluoropolymeric film described herein, can have one or more of the two hydrogen atoms substituted with a hydroxyl group. The second method starts at step 402 and proceeds to step 404, wherein a PVDF film, for example, a PVDF film approximately six to ten micrometers thick, is delivered into a film processing apparatus, as discussed above. An inner volume of the film processing apparatus is evacuated using a gas valve and pump at step 406. The inner volume may be evacuated to any suitable pressure, for example, 100 millitorr or lower, to approximately 1 millitorr, or to 1 microtorr. The inner volume is then backfilled with a gas, for example, an inert gas, such as argon gas or nitrogen gas or like gases at step 408. The PVDF film is next exposed to an electron beam at step 410. In at least one embodiment according to the invention, the PVDF film absorbs approximately 10-35 kGrays and, for at least one exemplary embodiment, 12-31 kGrays. As discussed above, it is believed that the electron beam generates radicals on the backbone, e.g., by removing one or more hydrogen atoms bonded to one or more carbon atoms.

At step 412, the inert gas is removed from the inner volume and the PVDF film is exposed to a liquid reactant. The PVDF film may be removed from the inner volume and placed in any chamber having, for example, hydrogen peroxide therein as a liquid reactant. In at least one exemplary embodiment according to the invention, the hydrogen peroxide is an aqueous solution comprising 50% hydrogen peroxide. Alternatively, the inner volume may be backfilled with the hydrogen peroxide and, as above, the inert gas is optionally evacuated before the hydrogen peroxide is backfilled. It is believed that the free radicals generated by the electron beam are reacted with the liquid solvent to append hydroxyl groups of the hydrogen peroxide onto the polymer of PVDF film. At step 414, optionally, the PVDF film having the hydroxyl groups is purified, such as by solvent extraction. At least one way to purify the film is via a Soxhlet device, for example, with methylene chloride for two to four hours, at which point the method ends at step 416. At least one alternative liquid reactant suitable for use at step 412 is ethyl alcohol, which, when exposed to the radicalized PVDF film, creates at least one pendant ethoxy group on the polymer backbone. Exemplary embodiments according to the invention include wherein the ethyl alcohol is a substantially anhydrous ethyl alcohol.

Figure 5:
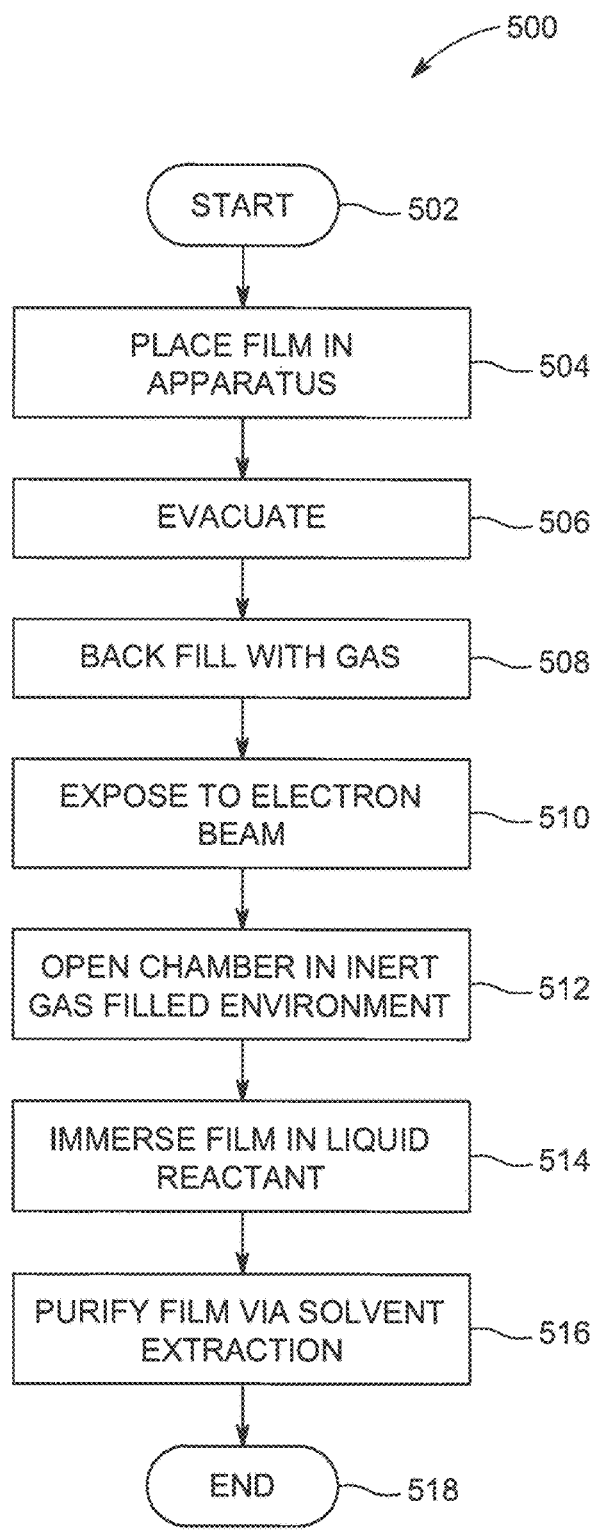
FIG. 5 depicts a flow diagram for a third method for manufacturing a modified fluoropolymer film according to embodiments of the invention.

FIG. 5 depicts a flow diagram 500 for a third method for manufacturing a modified fluoropolymer film according to embodiments of the invention. For example, PVDF, which has a chemical formula of a repeat unit of —$(C_2H_2F_2)$—$_n$, or other fluoropolymeric film described herein, can have at least one of the two hydrogen atoms substituted with an aromatic group, for example, 2-phenylethyl, phenyl, alkylphenyl, naphthalene, alkylnaphthalene, or higher order of fused or non-fused aromatic groups. The fifth method starts at step 502 and proceeds to step 504, wherein a polymeric film, for example, a PVDF film approximately six to ten micrometers thick, is delivered into a film processing apparatus, as discussed above, and, in at least one embodiment, within a removable chamber. The chamber is evacuated using a gas valve and pump at step 506. The inner volume may be evacuated to any suitable pressure, for example, 100 millitorr or lower, to approximately 1 millitorr, or to 1 microtorr. The inner volume is then backfilled with a gas, for example, an inert gas, such as argon gas or nitrogen gas or like gases at step 508. The polymeric film is next exposed to an electron beam at step 510. In at least one embodiment according to the invention, the PVDF film absorbs approximately 10-35 kGrays and, for at least one exemplary embodiment, 12-31 kGrays. At step 512, the removable chamber having the polymeric film disposed therein is moved to an inert gas-filled environment, e.g., argon gas, and opened, exposing the polymeric film thereto. The polymeric film is then immersed in a liquid aromatic reactant at step 514, and, in at least one exemplary embodiment, a vinyl aromatic, such as styrene. The PVDF film having free radicals reacts with the styrene molecules to create the aromatic groups within the PVDF film. At step 516, the polymeric film is purified via a solvent extraction, such as Soxhlet extraction, as described above, and the method ends at step 518.

Figure 6:
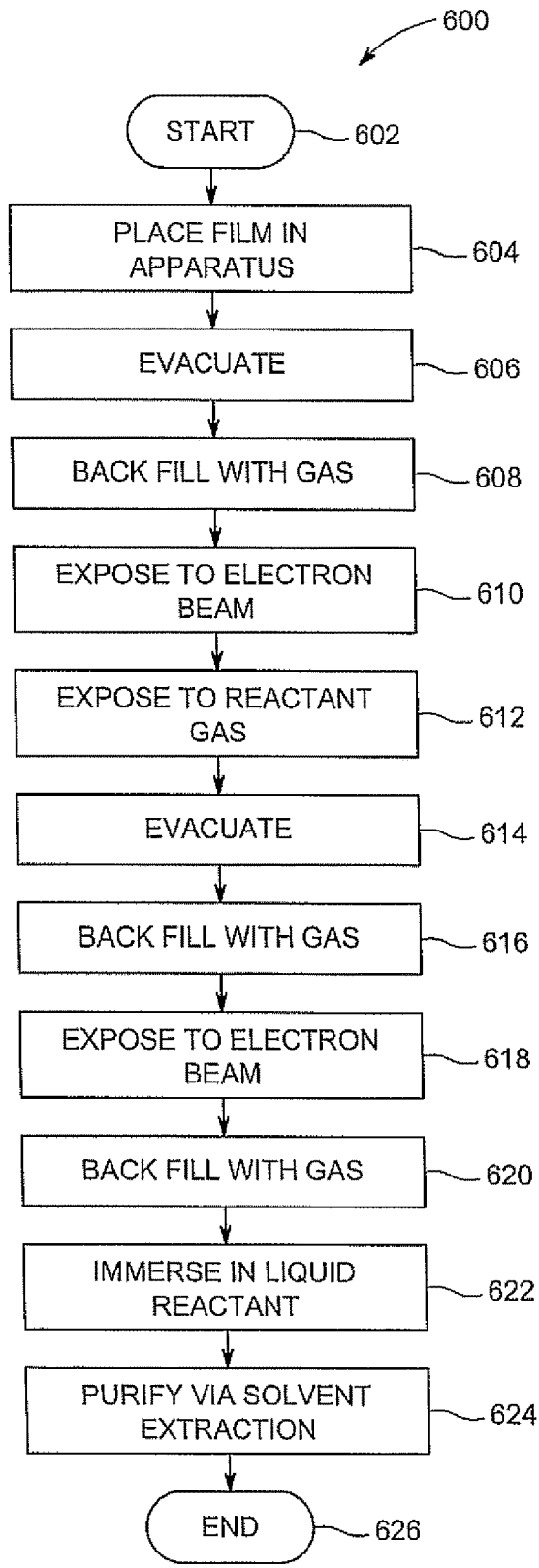
FIG. 6 depicts a flow diagram for a fourth method for manufacturing a modified fluoropolymer film according to embodiments of the invention.

FIG. 6 depicts a flow diagram 600 for a fourth method for manufacturing a modified fluoropolymer film according to embodiments of the invention. The fourth method starts at step 602 and proceeds to step 604, wherein a polymeric film, for example, a multi-copolymeric film, such as PVDF-CTFE, PVDF-HFP, PVDF-TrFE, or PFA, approximately six to ten micrometers thick, is delivered into a film processing apparatus, as discussed above, and, in at least one embodiment, within a removable chamber. The chamber is evacuated using a gas valve and pump at step 606. The inner volume may be evacuated to any suitable pressure, for example, 100 millitorr or lower, to approximately 1 millitorr, or to 1 microtorr. The inner volume is then backfilled with a gas, for example, an inert gas, such as argon gas or nitrogen gas or like gases at step 608. The polymeric film is next exposed to an electron beam at step 610. In at least one embodiment according to the invention, the polymeric film absorbs approximately 10-35 kGrays and, for at least one exemplary embodiment, 12-31 kGrays. At step 612, the inert gas is optionally evacuated via a valve from the inner volume before a reactant gas is backfilled. Alternatively, the reactant gas may be supplied to the inner volume, displacing the inert gas. The polymeric film is exposed to a reactant gas, for example, ozone gas, as discussed above, which creates carbonyl groups on the polymer backbone, as discussed above. At step 614, the chamber is again evacuated and backfilled with an inert gas, such as argon and or nitrogen gas, at step 616. At step 618, the polymeric film undergoes a second exposure to an electron beam, wherein the polymeric film may absorb more or less kGrays than as absorbed at step 610.

The removable chamber is subsequently moved to an inert gas environment, such as an argon gas-filled environment, and opened at step 620, exposing the polymeric film thereto. The polymeric film is then immersed in a liquid reactant, for example, anhydrous ethyl alcohol, at step 622, for approximately 20 hours or more, which creates ethoxy groups on the polymer backbone as discussed above. At step 624, the polymeric film is optionally purified via Soxhlet extraction, as described above, and the method ends at step 626.

Figure 7:
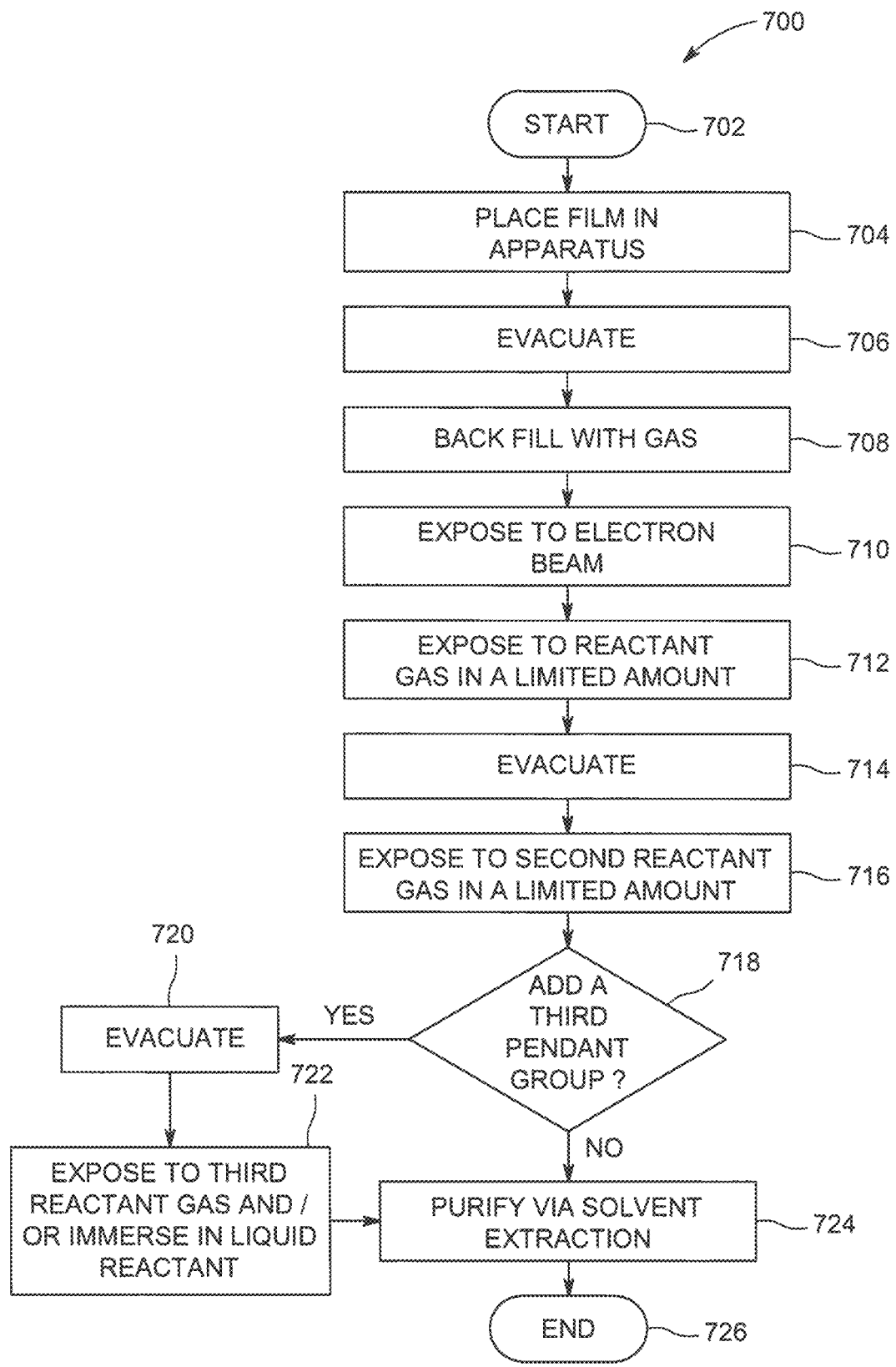
FIG. 7 depicts a flow diagram for a fifth method for manufacturing a modified fluoropolymer film according to embodiments of the invention.

FIG. 7 depicts a flow diagram 700 for a fifth method for manufacturing a modified fluoropolymer film according to embodiments of the invention. The fifth method starts at step 702 and proceeds to step 704, wherein a polymeric film, for example, a multi-copolymeric film, such as PVDF-CTFE, PVDF-HFP, PVDF-TrFE, or PFA, approximately six to ten micrometers thick, is delivered into a film processing apparatus, as discussed above, and, in at least one embodiment, within a removable chamber. The chamber is evacuated using a gas valve and pump at step 706. The inner volume may be evacuated to any suitable pressure, for example, 100 millitorr or lower, to approximately 1 millitorr, or to 1 microtorr. The inner volume is then backfilled with a gas, for example, an inert gas, such as argon gas or nitrogen gas or like gases at step 708. The polymeric film is next exposed to an electron beam at step 710, creating radicals on the fluoropolymer chain. In at least one embodiment according to the invention, the polymeric film absorbs approximately 10-35 kGrays and, for at least one exemplary embodiment, 12-31 kGrays. At step 712, the inert gas is optionally evacuated via a valve from the inner volume before a reactant gas is backfilled. Alternatively, the reactant gas may be supplied to the inner volume, displacing the inert gas. The polymeric film is exposed to a reactant gas in a limited amount, for example, ozone gas, as discussed above, which creates carbonyl groups on the polymer backbone, as discussed above. It is to be understood that the radicals on the fluoropolymer chain need not be completely reacted at step 712. For example, in at least one embodiment according to the invention, only 5% oxo groups are created by the use of a limiting amount of an ozone gas. Alternatively, approximately 95% of the radicals may become oxo groups, again using a limiting amount of ozone gas. At step 714, the chamber is again evacuated and backfilled with another reactant gas at step 716, for example, ethylene gas, creating ethyl pendant groups. It is to be understood that the molar ratios of carbonyl and ethyl equal 1 and either may be from approximately 0.05 to approximately 0.95.

Alternatively, at step 718, a decision is made whether to add a third (or fourth group following the addition of the third) pendant group. For example, from above, if both the ozone gas and ethylene gas were both introduced in limiting amounts, i.e., not all radicals were reacted, for example, if each was introduced in molar amounts correlating with, for example, from 0.05 to 0.90, such radicals could be reacted with another reactant gas or a reactant liquid. If a third pendant group is to be added, the inner volume is evacuated at step 720. At step 722, the polymeric film is exposed to the third reactant gas or a reactant liquid, for example, anhydrous alcohol to create ethoxy groups, hydrogen peroxide to create hydroxyl groups, and/or styrene to create aromatic groups.

At step 724, the polymeric film is optionally purified via solvent extraction, for example, Soxhlet extraction, as described above, and the method ends at step 726. It is to be understood that many fluoropolymers may be used in embodiments according to the invention, such as PVDF-CTFE, PVDF-HFP, PVDF-TrFE and/or PFA. Furthermore, embodiments according to the invention comprise where m, n, o, p, q and r segments are either integers, fractions or decimals that reflect the relative molar ratios of the copolymeric units as discussed above. For example, for polymeric structure (1), m and n must total 100% and m may be from 5 to 95% and n may be from 5 to 95%. Similarly, o and p in polymeric structure (2) and q and r in polymeric structure (3) must total 100% and may be from 5:95. For polymeric structures (4), (5), and (6), each of which have three segments, each may comprise molar ratios of 5 to 90%, so long as the sum is 100%. Also, if m, n, o, and q each comprise a pendant group, molar ratios of each range from 5-50%. Where m, n, o, p, q, and r are expressed in decimals, a sum of 1 is maintained. Furthermore, the copolymeric units represented by m, n, o, p, q and r could be arranged in alternating, block, or random manner as is known to those in the art.

It is to be understood that the electron beam can radicalize many sites on the polymer backbone. For example, any hydrogen atom that is bonded to any carbon atom may be removed and a radical created. This radicalized site is then a potential site for the substitution of a pendant group, e.g., ethoxy, alkyl, oxo, hydroxyl, aromatic, and the like, as discussed herein. Furthermore, embodiments according to the invention comprise multiple substitutions, i.e., any of the above mentioned pendant groups may be added to any of the modified fluoropolymer films in multiple areas on the polymer backbone. It is to be further understood that modified fluoropolymers may be manufactured using a range of radiation applied. For example, embodiments of the invention include the application of radiation up to 1000 kGrays to a fluoropolymer to create reactive radicals. Generally, the thicker the polymer, such a fluoropolymer sheet up to 4 cm thick, the larger dosage of radiation needed. It is also within embodiments of the invention to treat films as thin as 50 angstroms.

All ranges recited herein include ranges therebetween, inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4 . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent ranges starting at integer values at the recited order of magnitude or one lower, e.g., 3 or more includes 4 or more, or 3.1 or more.

The foregoing description, for purpose of explanation, has been described with reference to specific embodiments. However, the illustrative discussions above are not intended to be exhaustive or to limit embodiments of the present invention to the precise forms disclosed. Many modifications and variations are possible in view of the above teachings. The embodiments were chosen and described in order to best explain the principles of the present disclosure and its practical applications, to thereby enable others skilled in the art to best utilize embodiments of the present invention with various modifications as may be suited to the particular use contemplated.

Various elements, devices, modified polymers, and the like are described above in associated with their respective functions. These elements, devices, and modified polymers are considered means for performing their respective functions as described herein. The modified polymers may be used as dielectric materials, for capacitors, actuators, for energy harvesting, semi-conductors, such as semi-conductors disposed on substrates in chemical vapor deposition, and related processes and various electrical and/or electronic equipment. While the foregoing is directed to embodiments of the present invention, other and further embodiments of the invention may be devised without departing from the basic scope thereof, and the scope thereof is determined by the claims that follow.

What is claimed is:

1. A modified fluoropolymer, comprising:
at least one of polymer structures (1)-(6)

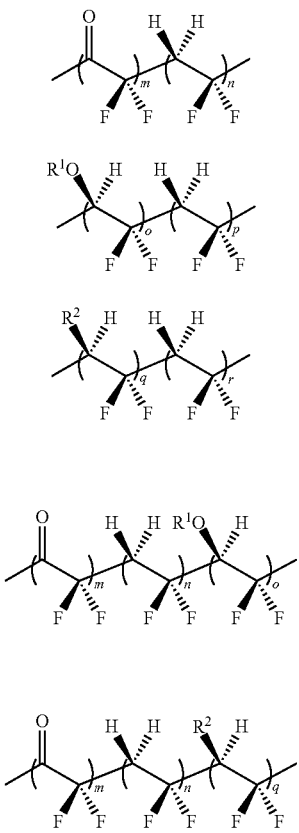

(1)
(2)
(3)
(4)
(5)

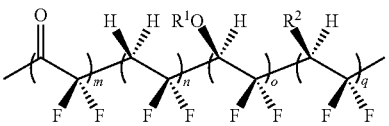

(6)

wherein $R^1$ is a hydrogen atom, an aromatic, or a saturated or unsaturated, normal or branched alkyl group having a carbon number ranging between 1 and 20, and/or wherein $R^2$ is a methoxy, ethoxy, an aromatic, or a saturated or unsaturated, normal or branched alkyl group having a carbon number ranging between 1 and 20; and wherein the copolymeric units m, n, o, p, q or r range in value from 0.05 to 0.80.

2. The modified fluoropolymer of claim 1, wherein the copolymeric units m, n, o, p, q or r are arranged either in block, alternating, or random nature.

3. The modified fluoropolymer of claim 1, wherein the aromatic is at least one of 2-phenylethyl, 2-phenylethyl acetate, 2-phenylethyl alcohol, or 2-phenylethyl ester.

4. A dielectric capacitor; comprising:
a first metal electrode;
a second metal electrode opposite the first metal electrode; and
a modified fluoropolymer film comprised of at least one of the modified fluoropolymers of claim 1 and disposed between the first metal electrode and the second metal electrode.

5. The dielectric capacitor of claim 4, wherein the modified fluoropolymer film is approximately six to ten micrometers in thickness.

6. The dielectric capacitor of claim 4, wherein the first metal electrode and second metal electrode comprise aluminum, an alloy of aluminum, or zinc.

7. The dielectric capacitor of claim 4, wherein a dielectric loss of the modified fluoropolymer film is approximately equal to a dielectric loss of PET or PP.

* * * * *